T. W. Lane,
Gas Meter,
No 7,703.   Patented Oct. 8, 1850.
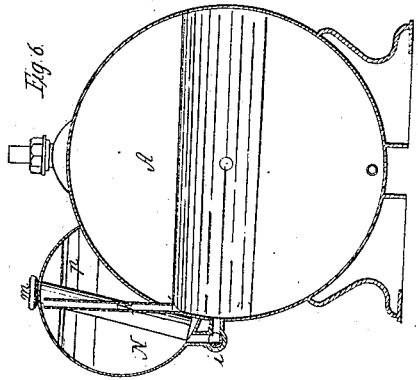
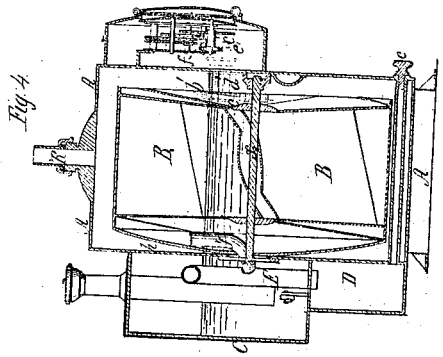
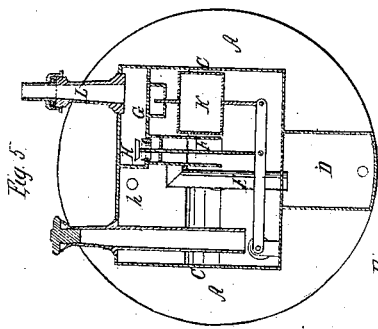
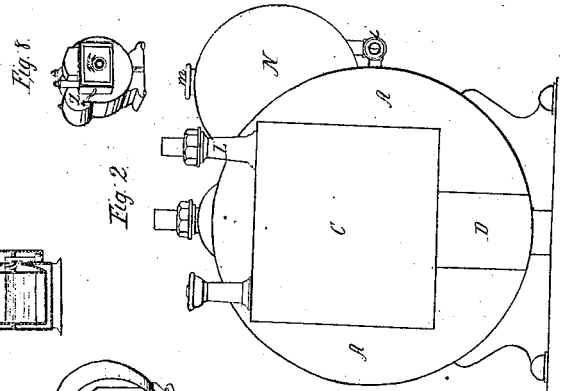
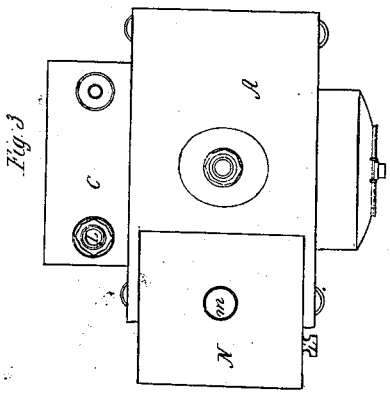
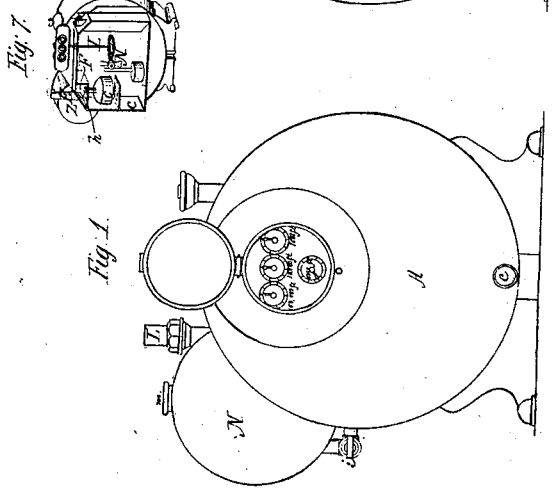

UNITED STATES PATENT OFFICE.

THOMAS W. LANE, OF WOBURN, MASSACHUSETTS.

IMPROVEMENT IN GAS-METERS.

Specification forming part of Letters Patent No. 7,703, dated October 8, 1850.

*To all whom it may concern:*

Be it known that I, THOMAS WILSON LANE, of Woburn, in the county of Middlesex and State of Massachusetts, have invented a new or Improved Gas-Meter; and I do hereby declare that the following is a description of the same.

That my improvements may be fully understood, I will describe the meters now in common use, speak of their defects, and then describe my invention or improvement for remedying those defects.

The drawings 1 2 3 4 5 6 7 8 9 give a clear and distinct view of my improved meter, as well as the meters in use in this country and in Europe, with this exception, that the reservoir Z, as shown in Figures 7 and 8, is not in general use, the same having been patented by Henry Robinson, of Boston, March 10, 1831, and being in use at the Boston Gas Light Company's works.

Of the said drawings, Fig. 1 denotes a front elevation of my improved meter. Fig. 2 is a rear elevation of it. Fig. 3 is a top view of it. Fig. 4 is a transverse vertical and central section of it. Fig. 5 is a longitudinal section of the rear chamber of the meter, the same being taken through the middle of the float therein. Fig. 6 is a longitudinal and vertical section of the reservoir and external case of the meter and made to represent the improvements in the reservoir or its connection with the main chamber of the meter. Fig. 7 is a representation or elevation of one of the old meters, the front side of its rear or float chamber being removed for the purpose of exhibiting the parts within the said chamber. Fig. 8 is a perspective elevation of the said old meter. Fig. 9 is a vertical, central, and transverse section of it, the internal construction of the drum-wheel not being exhibited, as the same kind of drum-wheel is used both in the old and new or improved meters, and is well understood by persons skilled in the art to which such instruments appertain.

Now I change the condition and arrangement of the meter by placing the clock-work and dials on the opposite end of the meter from that shown in Fig. 7, where motion is communicated from the revolving drum B, Fig. 9, to the clock-work by means of an endless screw, N, (on the end of the shaft upon which the drum rotates,) playing into an upright shaft, L, on the upper end of which is another endless screw which plays into the primary wheel of the clock-work.

In the meter as made by me the upright shaft is dispensed with, and a pinion-wheel, $a'$, (see Fig. 4,) is attached to the opposite end of the drum-shaft $x$, and is employed and made to gear into a toothed wheel, $b'$, which is on a secondary shaft, $c'$, this shaft passing through a stuffing-box, $d'$, which passes through what was the back head of the meter-case, and on the outer end of this is a pinion, $e'$, which gears into the primary wheel $f''$ of the clock-work, (dotted lines in Fig. 4 representing many of such parts,) and thus communicates motion to the clock-work, as seen at $f''$, and keeps registry of the number of revolutions of the drum B, and by these means determining the quantity of gas which has passed through the meter. This action is much more simple and durable than that generally used, and has this important advantage, that in no case, however great may be the pressure, can there be an overflow of water, which destroys the gearing of the clock-work; nor can there be any escape of gas up into the box which contains the same. Thus one of the important defects in the old meter is avoided and it is made much less liable to derangement. I do not claim the whole of this arrangement as new, but only the use of the secondary shaft, which, being much smaller in diameter than the main shaft and moving one-third or one-fourth as fast, there is less friction and consequently less wear in the stuffing-box. Should in the course of years this packing be destroyed, by removing the casing which covers the clock-movement the shaft can be repacked, the casing replaced, and the meter put in perfect order in less than one hour.

Secondly, it is known to all who use gas that occasionally, and particularly when all the burners are brought into use, the light will commence flickering and then suddenly go out, leaving the house in entire darkness. This is occasioned by the falling of the water in the chamber C, in which is the valve-float G. (See Fig. 7.) The gas entering the inlet-pipe E, into the chamber F, in which is the valve $h'$, and passing through the valve-seat, and first acting upon the water in this chamber, causes it to descend, carrying with it the valve-float. Now if the water is in any degree below its true level, and the gas is let on with full pressure, the valve $h'$ will close at once and cut off the gas. To obviate this, a much larger range is given to the rise and fall of the valve, and the manufacturer is subject to much loss, as a few lights can be kept burning long after the water is low enough to subject the gas company to a loss of from ten to fifteen per cent. To obviate this evil and make a meter which shall be a just measure between buyer and seller, and not be subject to the annoyances before mentioned, I have invented and brought into use the arrangement which I claim as new.

By removing from the chamber (in which is the inlet-pipe, valve-float, and dry well) the toothed wheel and upright shaft I am enabled to extend the horizontal chamber in which is the valve to any length I may choose. This I have done, as shown in the drawings, and I now place the valve H (see Fig. 5) above the vertical part or chamber F, which extends below the water-line and is open at the bottom. From the side of this chamber is an opening and pipe, E, communicating with the dry well D and soldered tight to the same. From this dry well the bent tube $f'$ (see Fig. 4) conducts the gas into the interior of the drum B. The gas entering the meter through the inlet-pipe L passes through the horizontal chamber G, down through the vertical chamber F, into the dry-well tube E, thence through the bent tube $f'$, and its pressure is first felt in the vertical chamber F and the interior of the drum, slightly depressing the water within them and causing it to rise in the chamber C, in which is the valve-float K. By this arrangement consumers of gas are certain that if they can light their gas at all they may be sure of a full supply for that time of burning.

When the gas is shut off by means of the small hole $h$ in the head of the meter-case A, the pressure is equalized, and the water becomes level in both chambers, and if the water has become still lower in the meter in consequence of use the next night no gas can be obtained, and notice will be given at the company's office at once, and a supply of water may be put into the reservoir N, first shutting the stop-cock $i$ and taking out the screw $c$ in the lower part of the front of the meter, fill the reservoir, put in the screws, open the stop, and the meter is ready for use.

My next improvement is in the reservoir Z, Figs. 7 and 8. From long experience it has been found that the reservoir would not, under all circumstances, give up its supply of water when wanted, it was slow and uncertain in its action, and required much nicety in its adjustment, the gas having at all times to overcome the hydrostatic pressure of the water before it could pass up and permit the water to flow out, and if it happened to be filled entirely full, so as to have no air above the water, it could not be made to act at all. To overcome these difficulties, I now perforate a small aperture in the meter-case at the true water-level. Into this aperture I solder a tube, $k$, (see Fig. 6,) the bore of which is about one-fourth of an inch diameter. This tube passes into the reservoir N and rises within one-fourth of an inch of the top. When the water is put into the reservoir, it can rise no higher than the top of this tube. It will now be self-evident that when the water in the body of the meter falls below the opening of this tube the gas will at once pass up and pressing on the surface of the water causes it to descend through the stop cock $i$ until the water rises in the body of the meter and seals the mouth of the tube, when it will remain at rest until the water again falls, and this will be repeated without fail, and the water in the body of the meter will never vary more than one-eighth of an inch until the water is exhausted, thus producing an accuracy of measurement which has not heretofore been obtained. I also attach a filling-tube, P, to the reservoir, which is closed by a screw, $m$. This tube passes nearly to the bottom of the reservoir, and at all times seals the same and prevents the entrance of air or escape of gas.

I claim—

1. The introduction of the secondary shaft connecting by means of a wheel and pinion with the drum-shaft in the interior of the meter-case.

2. The arrangement, substantially as shown, by which the gas is passed at once into the interior of the drum, and removing the pressure from the chamber in which is the valve-float, or by whatever means this effect is produced.

T. W. LANE.

Witnesses:
  CALEB EDDY,
  F. GOULD.